United States Patent
Young et al.

(10) Patent No.: US 7,316,417 B2
(45) Date of Patent: Jan. 8, 2008

(54) INFLATOR WITH INTERNALLY MOUNTED INITIATOR

(75) Inventors: Anthony M. Young, Malad, ID (US); Scott Jackson, Centerville, UT (US); Paul Dinsdale, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 326 days.

(21) Appl. No.: 10/881,629

(22) Filed: Jun. 30, 2004

(65) Prior Publication Data

US 2006/0001247 A1    Jan. 5, 2006

(51) Int. Cl.
*B60R 21/26*    (2006.01)
(52) U.S. Cl. .................................................. 280/737
(58) Field of Classification Search ............... 280/735, 280/736, 737, 741, 740
See application file for complete search history.

(56) References Cited

U.S. PATENT DOCUMENTS

| | | | |
|---|---|---|---|
| 5,474,328 A | 12/1995 | Nilsson | |
| 5,518,268 A | 5/1996 | Moore et al. | |
| 5,533,751 A | 7/1996 | Kort et al. | |
| 5,608,183 A | 3/1997 | Barnes et al. | |
| 5,788,270 A | 8/1998 | HÅland et al. | |
| 5,794,973 A | 8/1998 | O'Loughlin et al. | |
| 5,799,969 A | 9/1998 | Coleman et al. | |
| 5,839,754 A * | 11/1998 | Schluter et al. | 280/736 |
| 5,863,066 A | 1/1999 | Blumenthal | |
| 5,984,351 A * | 11/1999 | Pierotti et al. | 280/736 |
| 6,076,852 A | 6/2000 | Faigle | |
| 6,142,514 A * | 11/2000 | Yamato et al. | 280/736 |
| 6,143,102 A | 11/2000 | Mendenhall et al. | |

(Continued)

FOREIGN PATENT DOCUMENTS

WO    WO 90/09295    8/1990

(Continued)

*Primary Examiner*—Paul N. Dickson
*Assistant Examiner*—Joseph Rocca
(74) *Attorney, Agent, or Firm*—Sally J. Brown; Pauly Petersen & Erickson (57) ABSTRACT

An inflator device including a pressure vessel forming a gas storage chamber having contents including a supply of stored pressurized gas. The pressure vessel forms a gas exit opening at a first end of the pressure vessel. An initiator assembly includes an initiator cover that extends through a sidewall of the pressure vessel at a first end portion of the pressure vessel, such that at least a portion of the initiator cover extends radially inwardly into the gas storage chamber. An initiator is positioned within the initiator cover, and produces a discharge effective to rupture a rupturable closure element normally covering the gas exit opening to allow flow of at least a portion of the gas storage chamber contents through the gas exit opening. A first radial aperture formed in the initiator cover is positioned at a direct discharge distance with respect to the closure element to focus the initiator discharge at the closure element to rupture the closure element. In one preferred embodiment of the invention, the inflator device also includes a supply of gas-generating pyrotechnic material contained within the gas storage chamber, wherein at least a portion of the supply of gas-generating pyrotechnic material is reactable to produce a product gas. A second aperture is formed in the initiator cover, and is in reaction initiation communication with the supply of gas-generating pyrotechnic material.

28 Claims, 5 Drawing Sheets

U.S. PATENT DOCUMENTS

| | | |
|---|---|---|
| 6,247,725 B1 | 6/2001 | Möller |
| 6,286,864 B1 | 9/2001 | Green et al. |
| 6,439,604 B1 | 8/2002 | Al-Amin et al. |
| 6,516,726 B2 | 2/2003 | Specht |
| 6,572,141 B2 | 6/2003 | Nanbu |
| 6,726,243 B2 | 4/2004 | Dinsdale et al. |
| 6,820,898 B2* | 11/2004 | Dinsdale et al. ............ 280/737 |
| 6,834,885 B2* | 12/2004 | Mizuno et al. ............. 280/737 |
| 6,851,705 B2* | 2/2005 | Young et al. ............... 280/729 |
| 2002/0185849 A1 | 12/2002 | Sawa et al. |
| 2003/0029349 A1 | 2/2003 | Katsuda et al. |
| 2003/0062713 A1 | 4/2003 | Young et al. |
| 2003/0111831 A1 | 6/2003 | Horton et al. |
| 2003/0111832 A1 | 6/2003 | Kelley et al. |
| 2003/0178827 A1* | 9/2003 | Dinsdale et al. ............ 280/736 |
| 2003/0178828 A1* | 9/2003 | Rink et al. .................. 280/741 |
| 2005/0082805 A1* | 4/2005 | Blackburn ................. 280/737 |
| 2005/0173906 A1* | 8/2005 | Nakayasu et al. .......... 280/737 |
| 2007/0176404 A1* | 8/2007 | Yano ......................... 280/737 |

FOREIGN PATENT DOCUMENTS

| | | |
|---|---|---|
| WO | WO 03/068567 | 8/2003 |
| WO | WO 2004/031003 | 4/2004 |

\* cited by examiner

INFLATOR WITH INTERNALLY MOUNTED INITIATOR

BACKGROUND OF THE INVENTION

This invention relates generally to an inflation assembly for providing or supplying inflation gas to an associated inflatable passive restraint system for use in vehicles for restraining the movement of an occupant in the event of a vehicular collision. More particularly, this invention relates to providing or supplying such inflation gas via an inflator device having an initiator assembly at least partially mounted within a pressure vessel to rupture a closure element, which normally covers a gas exit opening of the pressure vessel.

It is well known to protect a vehicle occupant by means of safety restraint systems, i.e., "passive restraint systems", which self-actuate from an undeployed to a deployed state without the need for intervention by the operator. Such systems commonly contain or include an inflatable vehicle occupant restraint element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior.

In addition to an airbag cushion, inflatable passive restraint systems also typically include a gas generator, also commonly referred to as an "inflator." Upon actuation, such an inflator device desirably serves to provide an inflation fluid, typically in the form of a gas, used to inflate an associated airbag cushion. Many types or forms of inflator devices have been disclosed in the art for use in inflating an inflatable passive restraint system airbag cushion.

Figure 1:
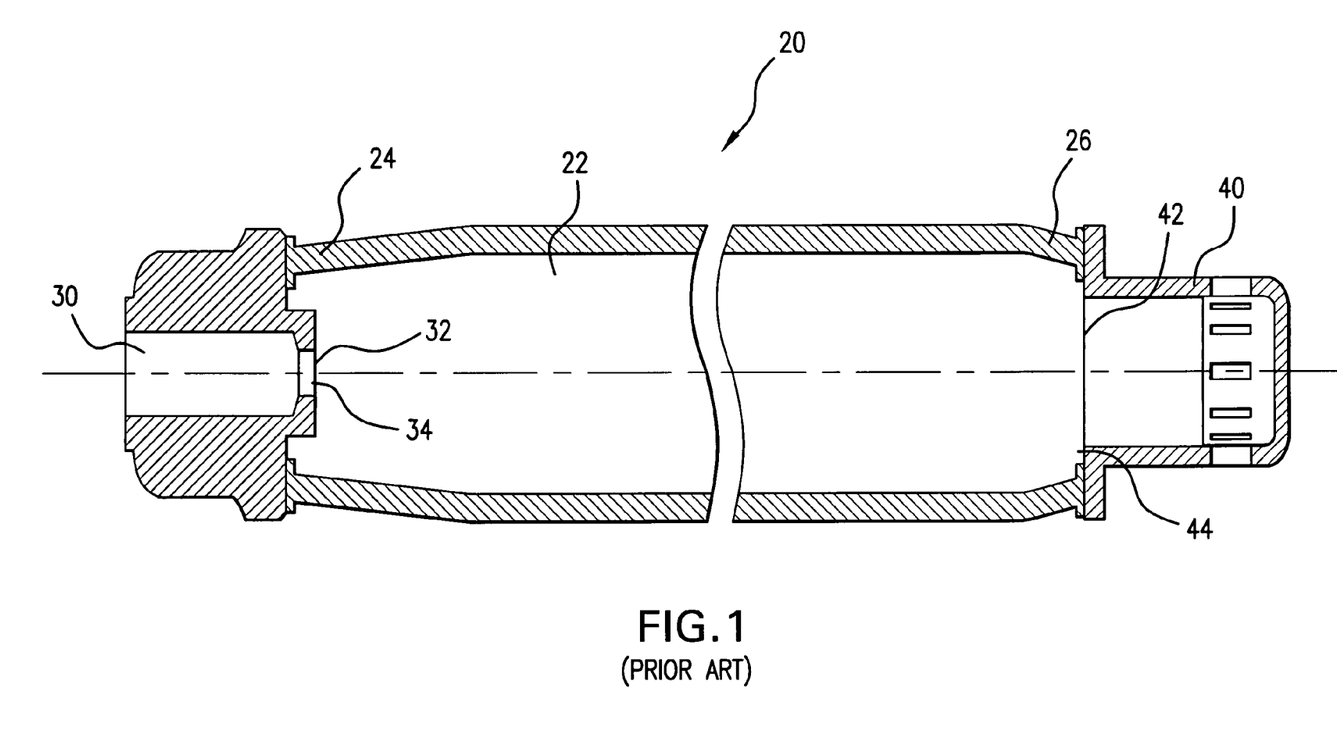
FIG. 1 is a simplified fragmentary side view, in section, of a prior art inflator device.

Many conventional inflator devices include an initiator and discharge outlet(s) disposed at opposite ends thereof. One such conventional inflator device 20 is shown in FIG. 1. The inflator device 20 includes a gas storage chamber 22 having a base end portion 24 and an opposing diffuser end portion 26. An initiator 30 is positioned at the base end portion 24 and a first burst disk 32 normally covers a base end opening 34 of the gas storage chamber 22 to prevent fluidic communication between the initiator 30 and the gas storage chamber 22. A diffuser 40 is positioned at the opposing diffuser end portion 26 and a second burst disk 42 normally covers a diffuser end portion 44 of the gas storage chamber 22 to prevent fluidic communication between the gas storage chamber 22 and the diffuser 40. Upon activation of the initiator 30, the initiator 30 produces a discharge that ruptures the first burst disk 32 and heats a supply of pressurized gas stored within the gas storage chamber 22. As the supply of pressurized gas is heated, an internal pressure within the gas storage chamber 22 is increased to an internal pressure level sufficient to rupture the second burst disk 42 to provide fluidic communication between the gas storage chamber 22 and the diffuser 40. The heated gas then exits the gas storage chamber 22 through the diffuser 40 to initiate deployment of an associated inflatable airbag cushion (not shown in FIG. 1).

In such conventional inflator devices, the internal pressure within the gas storage chamber typically increases significantly during the initiation stage, thus requiring an inflator device having a sidewall of significant thickness to withstand the increase in internal pressure. The increased thickness of the sidewall may result in an inflator device that is heavier and larger than desired. Additionally, because the initiator is positioned at an opposite end of the chamber with respect to the diffuser, the need to ensure reliable operation, e.g., reliable rupturing of the burst disk, e.g., reliable rupturing of burst disk 42, can serve to effectively limit or restrict the length of the gas storage chamber and hence the quantity of gas stored in the gas storage chamber. Further, the pressurized gas within the chamber is heated to a relatively high gas temperature within the time required to provide an internal pressure sufficient to rupture the second burst disk.

In view of the above, there is a need and a demand for a more reliable inflation assembly for deployment or inflation of an associated inflatable restraint device.

There is also a need and a demand for an inflator device wherein a change in gas storage chamber internal pressure is minimized to allow for the use of a thinner wall material to reduce cost, inflator weight and/or inflator size.

Further, there is a need and a demand for an inflator device including components having a simplified geometry and greater flexibility for different passive restraint systems.

Still further, there is a need and a demand for an inflator device wherein a stored pressurized gas with or without a gas-generating pyrotechnic material can be utilized to inflate an associated inflatable restraint device, depending upon the performance requirements.

SUMMARY OF THE INVENTION

A general object of the invention is to provide an improved inflator device.

A more specific objective of the invention is to overcome one or more of the problems described above.

The above and other objects of the invention can be attained through an inflator device including a pressure vessel extending along a longitudinal axis. The pressure vessel forms a gas storage chamber having contents including a supply of stored pressurized gas. A gas exit opening is formed at a first end of the gas storage chamber, and a rupturable closure element normally covers the gas exit opening. The inflator device also includes an initiator assembly including an initiator cover mounted to a sidewall of the pressure vessel at a first end portion of the pressure vessel. At least a portion of the initiator cover extends radially inwardly into the gas storage chamber toward the longitudinal axis. An initiator is positioned within the initiator cover. The initiator produces a discharge effective to rupture the closure element to allow flow of at least a portion of the gas storage chamber contents through the gas exit opening. The initiator cover forms a first radial aperture, which is positioned at a direct discharge distance with respect to the closure element to focus the initiator discharge at the closure element to rupture the closure element.

The prior art generally fails to provide an inflator device wherein a change in gas storage chamber internal pressure is minimized to allow for the use of a thinner wall material to reduce cost, inflator weight and/or inflator size. Further, the prior art generally fails to provide a reliable inflator device for deployment or inflation of an associated inflatable restraint device including components having a simplified geometry and greater flexibility for different passive restraint systems. The prior art also fails to provide such an inflator device which utilizes a stored pressurized gas with or without a gas-generating pyrotechnic material to inflate an associated inflatable restraint device, depending upon the performance requirements.

The invention further comprehends an inflator device including a pressure vessel that forms a gas storage chamber having contents including a supply of stored pressurized gas. The gas storage chamber forms at a first end a gas exit opening that is normally obstructed by a rupturable burst disk. The burst disk is rupturable to allow flow of at least a portion of the gas storage chamber contents through the gas exit opening. The inflator device also includes an initiator assembly including an initiator cover extending through a sidewall of the pressure vessel. At least a portion of the initiator cover extends radially inwardly into the gas storage chamber. The initiator assembly also includes an initiator positioned within the initiator cover. The initiator produces a discharge effective to rupture the burst disk. A first radial aperture is formed in the initiator cover, and is aligned with the gas exit opening. The first radial aperture is positioned at a direct discharge distance from the burst disk to focus the initiator discharge at the burst disk to rupture the burst disk, wherein the direct discharge distance is less than about 50% of a length of the gas storage chamber.

The invention still further comprehends an inflator device including a pressure vessel forming a gas storage chamber. A gas exit opening is formed at a first end of the gas storage chamber. Contained within the gas storage chamber is a supply of gas-generating pyrotechnic material, wherein at least a portion of the supply of gas-generating pyrotechnic material is reactable to produce a product gas. A burst disk normally obstructs the gas exit opening, and is rupturable to allow fluidic communication between the gas storage chamber and the gas exit opening. The inflator device also includes an initiator assembly including an initiator cover extending through a sidewall of the pressure vessel at a first end portion of the gas storage chamber. At least a portion of the initiator cover extends radially inwardly into the gas storage chamber. An initiator is positioned within the initiator cover. The initiator produces a discharge effective to rupture the burst disk and initiate a reaction of at least a portion of the supply of gas-generating pyrotechnic material to produce a product gas. The initiator cover forms a first radial aperture positioned at a direct discharge distance from the burst disk to focus the initiator discharge at the burst disk to rupture the burst disk. The initiator cover also forms a second aperture in reaction initiation communication with the supply of gas-generating pyrotechnic material.

As used herein, references to "direct discharge distance" are to be understood to refer to a distance or measurement between a first radial aperture formed in the initiator cover and a gas exit opening formed by the gas storage chamber, wherein a discharge produced by the initiator positioned within the initiator cover is directed or focused by the first radial aperture at or towards a burst disk normally covering or obstructing the gas exit opening to effectively and reliably rupture the burst disk.

Other objects and advantages of the invention are apparent to those skilled in the art, in view of the following detailed description taken in conjunction with the appended claims and drawings.

DETAILED DESCRIPTION OF THE INVENTION

Figure 2:
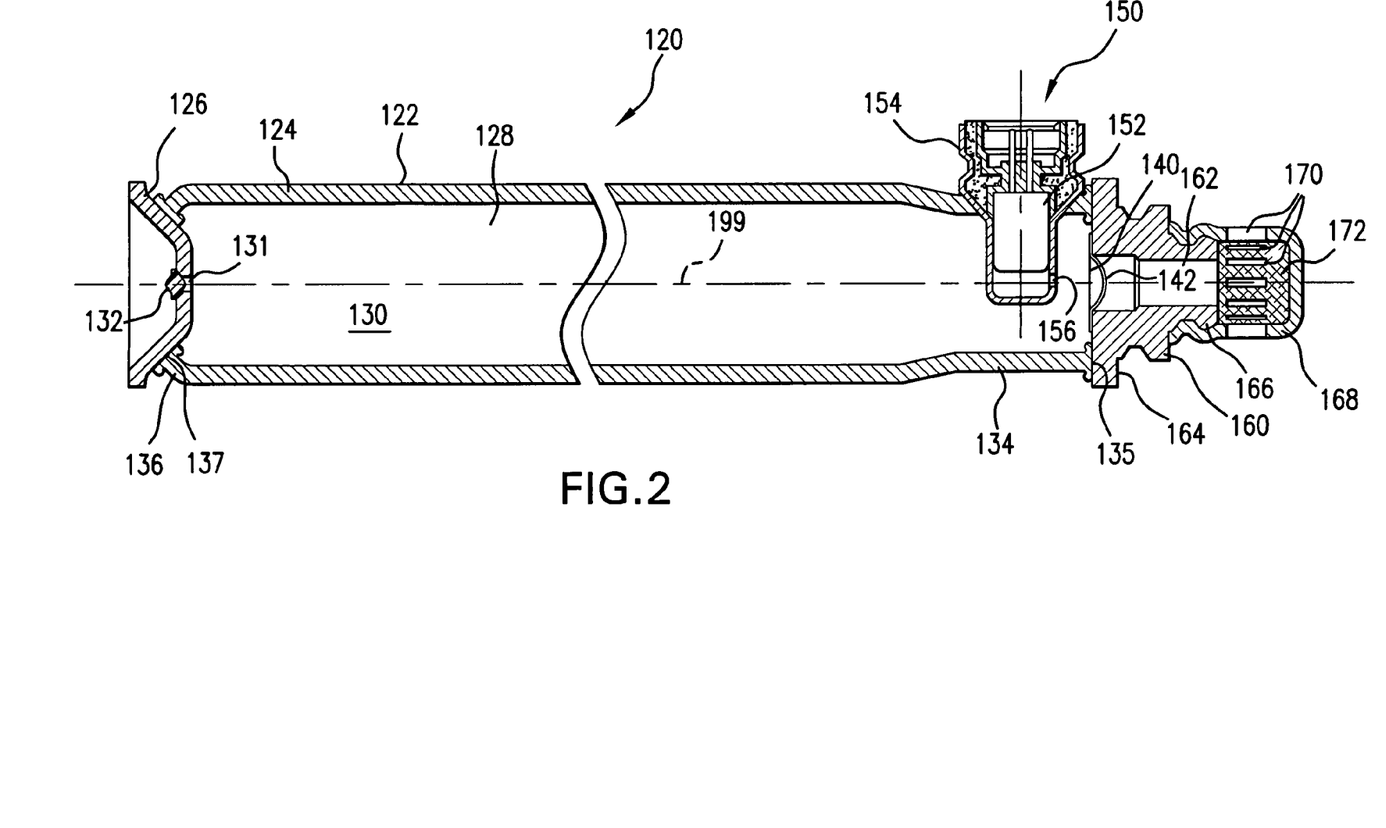
FIG. 2 is a fragmentary side view, in section, of an inflation assembly in accordance with one preferred embodiment of the invention.
Figure 3:
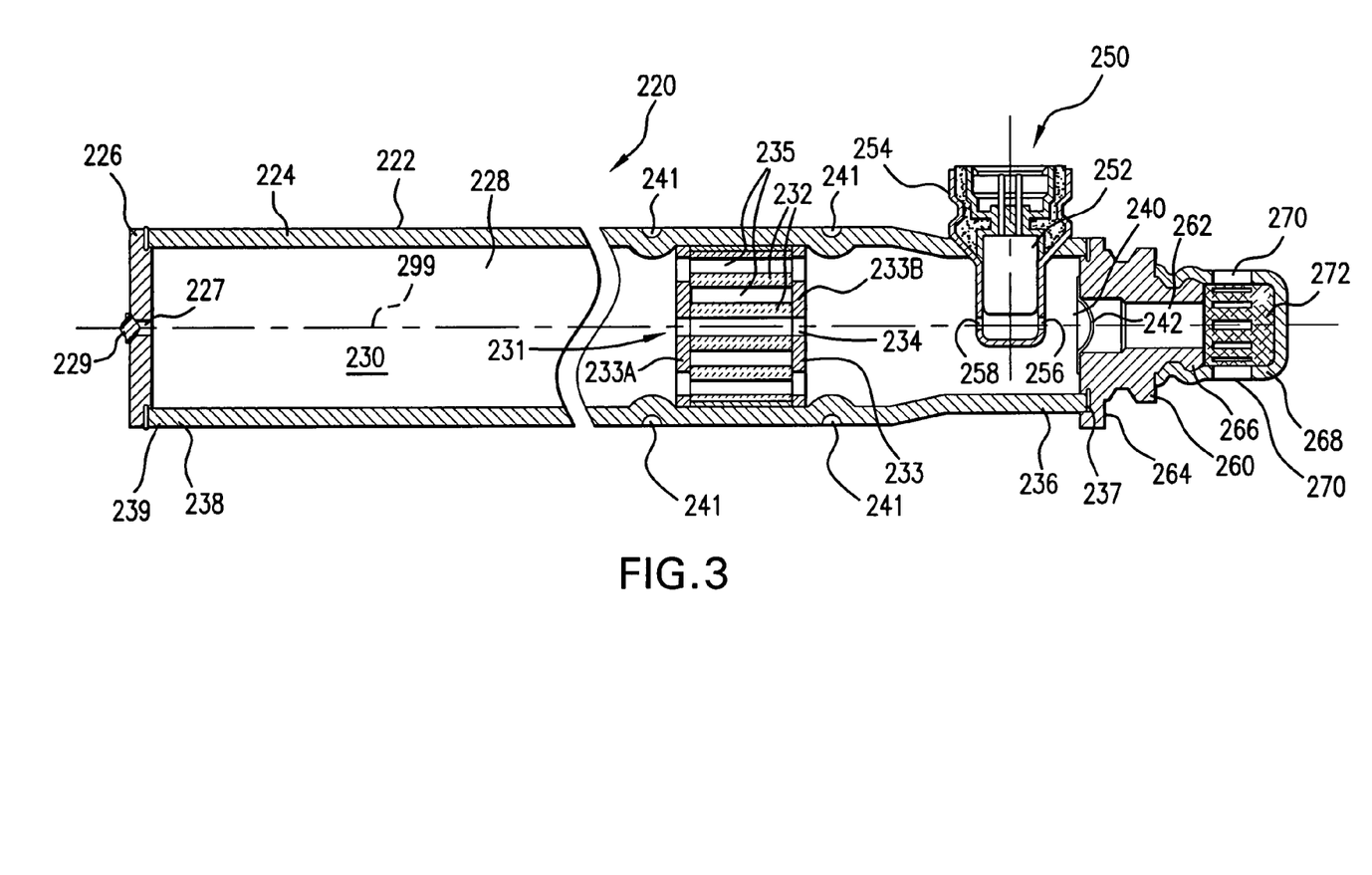
FIG. 3 is a fragmentary side view, in section, of an inflation assembly in accordance with another preferred embodiment of the invention.

The present invention provides an inflator device for supplying gas such as may be used in the inflation of an inflatable vehicle occupant restraint device, e.g., an inflatable airbag cushion, particularly, inflatable curtain type vehicle occupant restraints, such as identified above and as will be described in greater detail below. The inflator device of the present invention preferably utilizes stored pressurized gas with or without a gas-generating pyrotechnic material to inflate the associated inflatable vehicle occupant restraint device, depending upon the performance requirements. FIGS. 2 and 3 each illustrates the present invention as embodied in a respective inflation device in accordance with alternate embodiments of the invention.

FIG. 2 shows an inflator device 120 in static state and in accordance with one preferred embodiment of this invention. The inflator device 120 includes a pressure vessel 122 having a sidewall 124 and an end wall 126 connected to the side wall 124. The pressure vessel 122 generally forms an elongated generally cylindrical gas storage chamber 128. Preferably, the gas storage chamber 128 extends along a longitudinal axis 199 of the pressure vessel 122, as shown in FIG. 2. In the illustrated static or at rest condition for the inflator device 120, the gas storage chamber 128 is closed and has contents, designated by the reference numeral 130, therein stored or contained. The gas storage chamber contents 130 desirably include a quantity of pressurized stored gas such as may be used in the inflation of an associated inflatable device, such as an inflatable airbag cushion. Suitable gases include, but are not limited to, inert gases, such as helium and argon, and combinations thereof. Thus, according to one preferred embodiment of the invention, the gas storage chamber contents 130 contain a mixture of about 80% helium and about 20% argon.

Those skilled in the art and guided by the teachings herein provided will further appreciate that such pressurized or compressed contents can appropriately be stored or contained in the gas storage chamber 128 in gaseous, liquid or multi-phase form (i.e., partially gaseous and partially liquid mixture). As will be appreciated, the premium on size generally placed on modern vehicle design, generally results in a preference for smaller sized airbag inflators. In view thereof and the fact that the densities for such materials are significantly greater when in a liquid, rather than gaseous form, storage of such oxidant compressed gas materials at least partially in a liquid form may be preferred.

As shown in FIG. 2, the end wall 126 forms or includes a fill port 131, as is known in the art, wherethrough materials can be passed into the gas storage chamber 128. After the gas storage chamber 128 has been appropriately filled, the fill port 131 can be appropriately blocked or plugged, as is known, such as by a pin or ball 132. In the illustrated embodiment, the fill port 131 is shown in flow communication with the gas storage chamber 128. As will be appreciated, such a fill port, if included in the inflator device 120, can alternatively be placed or positioned, as may be desired and understood by those skilled in the art. Thus, the broader practice of the invention is not necessarily limited to the inclusion of a fill port or the position or placement thereof.

Referring to FIG. 2, the pressure vessel 122 has a first end portion 134 defining a first end 135 and an opposing second end portion 136 defining a second end 137. A gas exit opening 140 is preferably formed at the first end 135 of the pressure vessel 122. The gas storage chamber 128 has a length along the longitudinal axis defined as the measurement between the first end 135 and the opposing second end 137 of the pressure vessel 122. The gas storage chamber 128 is normally closed or obstructed to prevent fluidic communication between the gas storage chamber 128, containing the gas storage chamber contents 130, and the gas exit opening 140 by means of a closure element, such as a burst or rupture disk 142. Those skilled in the art and guided by the teachings herein provided will appreciate that closure elements of other suitable types or forms can desirably be used in the practice of the invention and the broader practice of the invention is not necessarily limited to particular or specific types or forms of closure elements.

The inflator device 120 further includes an initiator assembly 150. The initiator assembly 150 includes an initiator 152 which is housed or contained at least partially within an initiator cover 154. Such initiator 152 is known in the art and actuatable to produce a discharge effective to rupture the burst disk 142 to allow flow of at least a portion of the gas storage chamber contents 130 through the gas exit opening 140. In one preferred embodiment of the invention, the initiator cover 154 is mounted to the pressure vessel sidewall 124 at the first end portion 134 of the pressure vessel 122. At least a portion of the initiator cover 154 extends through the sidewall 124 at the first end portion 134 of the pressure vessel 122. Preferably, the initiator cover 154 extends radially inwardly into the gas storage chamber 128 toward the longitudinal axis 199.

Referring to FIG. 2, the initiator cover 154 forms at least one first radial aperture 156. Preferably but not necessarily, the first radial aperture 156 is axially aligned or positioned with the gas exit opening 140 and the burst disk 142. In one preferred embodiment of the invention, the first radial aperture 156 and the gas exit opening 140 each is positioned about the pressure vessel longitudinal axis 199 to allow the initiator discharge to directly communicate with the burst disk 142. The first radial aperture 156 is positioned at a direct discharge distance with respect to the burst disk 142 to focus the initiator discharge at or towards the burst disk 142 to rupture the burst disk 142 and allow fluidic communication between the gas storage chamber 128 and the gas exit opening 140, wherein at least a portion of the gas storage chamber contents 130 can flow through the gas exit opening 140. Preferably, the direct discharge distance is less than about 50% of a length of the gas storage chamber 128 along the longitudinal axis 199, more preferably less than about 33% of the gas storage chamber length along the longitudinal axis 199, and in many cases less than about 25% of the gas storage chamber length along the longitudinal axis 199. In accordance with one preferred embodiment of the invention, the direct discharge distance is less than about 15% of the gas storage chamber length along the longitudinal axis 199, and more preferably less than about 10% of the gas storage chamber length along the longitudinal axis 199. Because the first radial aperture 156 is positioned within the direct discharge distance with respect to the burst disk 142, the first radial aperture 156 focuses or directs the initiator discharge at or towards the burst disk 142 to more reliably rupture the burst disk 140, when compared to conventional inflator devices wherein the initiator is positioned at an opposite end of the device with respect to the burst disk. Such placement allows for reliable rupturing or opening of a burst disk of suitable thickness and covering a suitably sized gas exit opening.

With the initiator 152 positioned at the first end portion 134 in close relation with gas exit opening 140 and in direct communication with the burst disk 142, i.e., the first radial aperture 156 positioned within the direct discharge distance with respect to the burst disk 142, the maximum internal pressure in the gas storage chamber 128 will remain much closer to the static state or storage pressure within the gas storage chamber 128, as compared to conventional inflator devices such as described above. Thus, the sidewall 124 of the pressure vessel 122 according to the present invention can have a thickness significantly thinner than a thickness of conventional vessel walls required to accommodate or withstand large increases in internal pressure required to rupture the burst disk. The relatively thinner sidewall 124 provide a saving on manufacturing costs, envelope, and inflator weight. Further, cold gas can be released into the associated inflation device, such as an inflatable restraint cushion, at the beginning of the deployment, which will enable faster in-position times without overstressing the associated inflatable restraint cushion.

As shown in FIG. 2, the inflator device 120 also includes a diffuser body 160 forming a diffuser channel or passage 162 generally positioned coaxially with the pressure vessel longitudinal axis 199. The diffuser body 160 has a first end 164 connected or mounted with respect to the first end portion 134 of the pressure vessel 122 and a second end portion 166. The diffuser body 160 can be connected or mounted to the pressure vessel 122 using any suitable connecting or mounting means known to those having ordinary skill in the art and guided by the teachings herein provided. A diffuser cap 168 is connected or mounted to the second end portion 166 and preferably forms a plurality of diffuser orifices 170 generally positioned radially about a periphery of the diffuser cap 168. In the illustrated embodiments, the diffuser cap 168 is shown as being formed as a separate component such as joined or connected to the diffuser body 160. It is to be appreciated, however, that the broader practice of the invention is not necessarily so limited. For example, if desired, the invention can be practice using the diffuser cap 168 formed in or as a part of the diffuser body 160 and forming a plurality of diffuser orifices 170. The diffuser channel 162 provides for fluidic or gas flow communication between the gas storage chamber 128 and each diffuser orifice 170. Each diffuser orifice 170 dispenses inflation product gas from the inflator device 120 into an associated inflatable restraint device or airbag cushion (not shown in FIG. 2) in communication with the inflator device 120. Unlike many prior art diffuser assemblies which require complicated componentry for positioning the initiator within the inflator assembly, the present invention uses simplified components. For example, because the initiator assembly 150 is at least partially positioned or mounted within the pressure vessel 122, the diffuser design and configuration can be simplified to provide axial flow and/or radial flow, as desired for a particular inflator assembly application.

The diffuser cap 168 generally contains or houses a gas treatment element 172. In general accordance with the invention, desirable gas treatment of a contacting stream typically involves one or more of: cooling, redirection of flow, and removal or filtering of particulate from such contacting stream. In one preferred embodiment of the invention, the gas treatment element 172 is generally composed of a pack of woven and/or consolidated metal. Preferably, the gas treatment element 172 includes randomly oriented wire pieces housed within a specified volume. Those skilled in the art and guided by the teachings herein provided will, however, appreciate that other forms of gas treatment elements can, if desired, be used and that the broader practice of the invention is not necessarily limited to specific or particular forms or types of gas treatment elements.

The initiator 152 is activated by a control assembly (not shown in FIG. 2) in operational control communication with the inflator device 120. The control assembly provides an initiating signal to the initiator 152 to produce a discharge effective to rupture the burst disk 142, whereby the gas storage chamber contents can flow through the gas exit opening 140 and into the diffuser body 160. For example, one or more crash sensors, such as known in the art, capable of sensing or detecting one or more selected parameters relating to the occurrence of a crash, is in signal communication with an electronic control unit ("ECU"), which can serve to signal and control if and when the initiator 152 is actuated and consequently if and when the inflator device 120 is actuated to discharge a desired inflation fluid. For example, upon receipt of a proper or appropriate signal from the crash sensors, the ECU will signal or otherwise actuate the initiator 152 such as to produce a discharge effective to rupture the burst disk 142, whereby the gas storage chamber contents 130 can flow through the gas exit opening 140 and into the diffuser body 160.

FIG. 3 shows an inflator device 220 in static state and in accordance with another preferred embodiment of this invention. The inflator device 220 comprises a pressure vessel 222 having a sidewall 224 and an end wall 226 connected to the side wall 224. The end wall 226 preferably forms or includes a fill port 227, as is known in the art, wherethrough materials can be passed into a gas storage chamber 228 formed by the pressure vessel 220. After the gas storage chamber 228 has been appropriately filled, the fill port 227 can be appropriately blocked or plugged, as is known, such as by a pin or ball 229. In the illustrated embodiment, the fill port 227 is shown in flow communication with the gas storage chamber 228. As will be appreciated, such a fill port, if included in the inflator device 220, can alternatively be placed or positioned, as may be desired and understood by those skilled in the art. Thus, the broader practice of the invention is not necessarily limited to the inclusion of a fill port or the position or placement thereof. The pressure vessel 222 generally forms an elongated generally cylindrical gas storage chamber 228. Preferably, the gas storage chamber 228 extends along a longitudinal axis 299 of the pressure vessel 222, as shown in FIG. 3. In the illustrated static or at rest condition for the inflator device 220, the gas storage chamber 228 is closed and has contents, designated by the reference numeral 230, therein stored or contained. The gas storage chamber contents 230 desirably include a quantity of pressurized stored gas such as may be used in the inflation of an associated inflatable device, such as an inflatable airbag cushion. Suitable gases include the gases as described above in reference to one preferred embodiment of this invention shown in FIG. 2.

In one preferred embodiment of this invention, in addition to the pressurized stored gas such as described above, the gas storage chamber contents 230 desirably include a quantity of oxidant material such as may appropriately react with a fuel material to form or produce a supply of gaseous products such as may be used in the inflation of an associated inflatable device, such as an inflatable airbag cushion. Such oxidant, if present, may desirably be composed of a single oxidant material or a combination or mixture of two or more oxidant materials. Suitable oxidant materials, such as may be used alone or in combination, include oxygen and nitrous oxide, for example. The gas storage chamber contents 230, according to one preferred embodiment of the invention, consist essentially of an at least partially gaseous mixture of nitrous oxide, argon and/or helium. Alternatively, it is apparent to those skilled in the art and guided by the teachings herein provided that the gas storage chamber contents 230 can consist entirely of one selected gas, such as nitrous oxide, argon or helium, for example.

Referring to FIG. 3, the gas storage chamber 228 further preferably contains a supply of gas-generating pyrotechnic material 231. At least a portion of the supply of gas-generating pyrotechnic material 231 is reactable to produce a product gas such as may be used in the inflation of an associated inflatable device, such as an inflatable airbag cushion (not here shown), as discussed in more detail below. In addition to the product gas, the reaction of at least a portion of the supply of gas-generating pyrotechnic material also provides energy in the form of heat to the stored gas charge to increase deployment speed and further enhance performance. Suitable gas-generating pyrotechnic materials include gas generant compositions such as disclosed in Barnes et al., U.S. Pat. No. 5,608,183, issued 4 Mar. 1997, and Mendenhall et al., U.S. Pat. No. 6,143,102, issued 7 Nov. 2000, the disclosures of which are incorporated herein by reference. The broader practice of the invention, however, is not limited to particular or specific pyrotechnic materials. Those skilled in the art and guided by the teachings herein provided will appreciate that, if desired, other suitable gas-generating pyrotechnic materials, such as known in the art, may be employed.

As shown in FIG. 3, the supply of gas-generating pyrotechnic material 231 is in the form of a grain 232 contained or positioned within a heater assembly 233 defined in part by a pair of opposed baffle side walls 233A and 233B each including a plurality of holes 234 through which gas can flow. Preferably, the grain 232 includes channels 235, through which the pressurized stored gas flows for more even or uniform burning or reaction of the grain 232. Those skilled in the art will, however, appreciate that pyrotechnic materials in other forms such as pellets, disks, extrudlets, granules, tablets, powder or the like, for example, can be used in the practice of the invention. Thus, it will be appreciated that the broader practice of the invention is not necessarily limited by the specific form of gas-generating pyrotechnic material employed therein. In one preferred embodiment of this invention, the side wall 224 forms at least one crimp 241 to maintain the heater assembly 233 properly positioned within the gas storage chamber 228, as shown in FIG. 3.

Referring to FIG. 3, the pressure vessel 222 has a first end portion 236 defining a first end 237 and an opposing second end portion 238 defining a second end 239. A gas exit opening 240 is preferably formed at the first end 237 of the pressure vessel 222. The gas storage chamber 228 has a length along the longitudinal axis 299 defined as the measurement between the first end 237 and the opposing second end 239 of the pressure vessel 222. The gas storage chamber 228 is normally closed or obstructed to prevent fluidic communication between the gas storage chamber 228, containing the gas storage chamber contents 230, and the gas exit opening 240 by means of a closure element, such as a burst or rupture disk 242.

The inflator device 220 further includes an initiator assembly 250. The initiator assembly 250 includes an initiator 252 which is housed or contained at least partially within an initiator cover 254. Such initiator 252 is known in the art and actuatable to produce a discharge effective to rupture the burst disk 242 to allow fluidic communication between the gas storage chamber 228 and the gas exit opening 250 and/or to effect ignition of at least a portion of the supply of gas-generating pyrotechnic material 231 contained within the gas storage chamber 228, as later herein described.

In one preferred embodiment of the invention, the initiator cover 254 is mounted to the pressure vessel sidewall 224 at the first end portion 236 of the pressure vessel 222. At least a portion of the initiator cover 254 extends through the sidewall 224 at the first end portion 236 of the pressure vessel 222. Preferably, the initiator cover 254 extends radially inwardly into the gas storage chamber 228 toward the longitudinal axis 299. As shown in FIG. 3, the initiator assembly 250 is preferably positioned at the first end portion 236 and between the supply of gas-generating pyrotechnic material 231 and the gas exit opening 240.

Referring to FIG. 3, the initiator cover 254 forms or includes at least one first radial aperture 256. Preferably but not necessarily, the first radial aperture 256 is axially aligned or positioned with the gas exit opening 240 and the burst disk 242. In one preferred embodiment of the invention, the first radial aperture 256 and the gas exit opening 240 each is positioned about the pressure vessel longitudinal axis 299 to allow the initiator discharge to directly communicate with the burst disk 242. The first radial aperture 256 is positioned at a direct discharge distance with respect to the burst disk 242 to focus the initiator discharge at or towards the burst disk 242 to rupture the burst disk 242 and allow flow of at least a portion of the gas storage chamber contents, including the pressurized gas and the gas-generating pyrotechnic material product gas, through the gas exit opening 240.

The initiator cover 254 also forms or includes at least one second aperture 258, as shown in FIG. 3. The second aperture 258 is in reaction initiation communication with the supply of gas-generating pyrotechnic material 231 and preferably focuses the initiator discharge at the supply of gas-generating pyrotechnic material 231 contained within the gas storage chamber 228, to ignite the supply of gas-generating pyrotechnic material 231 and initiate production of the product gas. The product gas is releasable from within the gas storage chamber 228 through the gas exit opening 240 upon rupturing of the burst disk 242.

As shown in FIG. 3, the inflator device 220 also includes a diffuser body 260 forming a diffuser channel or passage 262 generally positioned coaxially with the pressure vessel longitudinal axis 299. The diffuser body 260 has a first end 264 connected or mounted with respect to the first end portion 236 of the pressure vessel 222 and a second end portion 266. The diffuser body 260 can be connected or mounted to the pressure vessel 222 using any suitable connecting or mounting means known to those having ordinary skill in the art and guided by the teachings herein provided. A diffuser cap 268 is connected or mounted to the second end portion 266 and preferably forms a plurality of diffuser orifices 270 generally positioned radially about a periphery of the diffuser cap 268. In the illustrated embodiments, the diffuser cap 268 is shown as being formed as a separate component such as joined or connected to the diffuser body 260. It is to be appreciated, however, that the broader practice of the invention is not necessarily so limited. For example, if desired, the invention can be practiced using the diffuser cap 268 formed in or as a part of the diffuser body 260 and forming a plurality of diffuser orifices 270. The diffuser channel 262 provides for fluidic or gas flow communication between the gas storage chamber 228 and each diffuser orifice 270. Each diffuser orifice 270 dispenses inflation product gas from the inflator device 220 into an associated inflatable restraint device or airbag cushion (not shown in FIG. 3) in communication with the inflator device 220.

The diffuser cap 268 generally contains or houses a gas treatment element 272. In general accordance with the invention, desirable gas treatment of a contacting stream typically involves one or more of: cooling, redirection of flow, and removal or filtering of particulate from such contacting stream. In one preferred embodiment of the invention, the gas treatment element 272 is generally composed of a pack of woven and/or consolidated metal. Those skilled in the art and guided by the teachings herein provided will, however, appreciate that other forms of gas treatment elements can, if desired, be used and that the broader practice of the invention is not necessarily limited to specific or particular forms or types of gas treatment elements.

The initiator 252 is activated by a control assembly (not shown in FIG. 3) in operational control communication with the inflator device 220. The control assembly provides an initiating signal to the initiator 252 to produce a discharge effective to rupture the burst disk 242, whereby the gas storage chamber contents can flow through the gas exit opening 240 and into the diffuser body 260, and initiate a reaction of at least a portion of the gas-generating pyrotechnic material 231. For example, one or more crash sensors, such as know in the art, capable of sensing or detecting one or more selected parameters relating to the occurrence of a crash, is in signal communication with an electronic control unit ("ECU"), which can serve to signal and control if and when the initiator 252 is actuated and consequently if and when the inflator device 220 is actuated to discharge a desired inflation fluid. For example, upon receipt of a proper or appropriate signal from the crash sensors, the ECU will signal or otherwise actuate the initiator 252 such as to produce a discharge effective to rupture the burst disk 242, whereby the gas storage chamber contents 230 can flow through the gas exit opening 240 and into the diffuser body 260. The initiator discharge is also effective to initiate a reaction of at least a portion of the gas-generating pyrotechnic material 231, wherein the gas-generating pyrotechnic material 231 ignites and produces a product gas and heat. The heat produced by the burning of the gas-generating pyrotechnic material 231 serves to heat the remaining gas storage chamber contents 230, including the remaining pressurized stored gas, as the gas storage chamber contents 230 passes through the heater assembly 233 and exits the gas storage chamber 228 through the gas exit opening 240, thereby causing thermal expansion of the gas. As will be appreciated, such heating can desirably serve to result in the thermal expansion of such stored gas and thus serve to minimize the volume of required stored contents within the inflator device.

Figure 4:
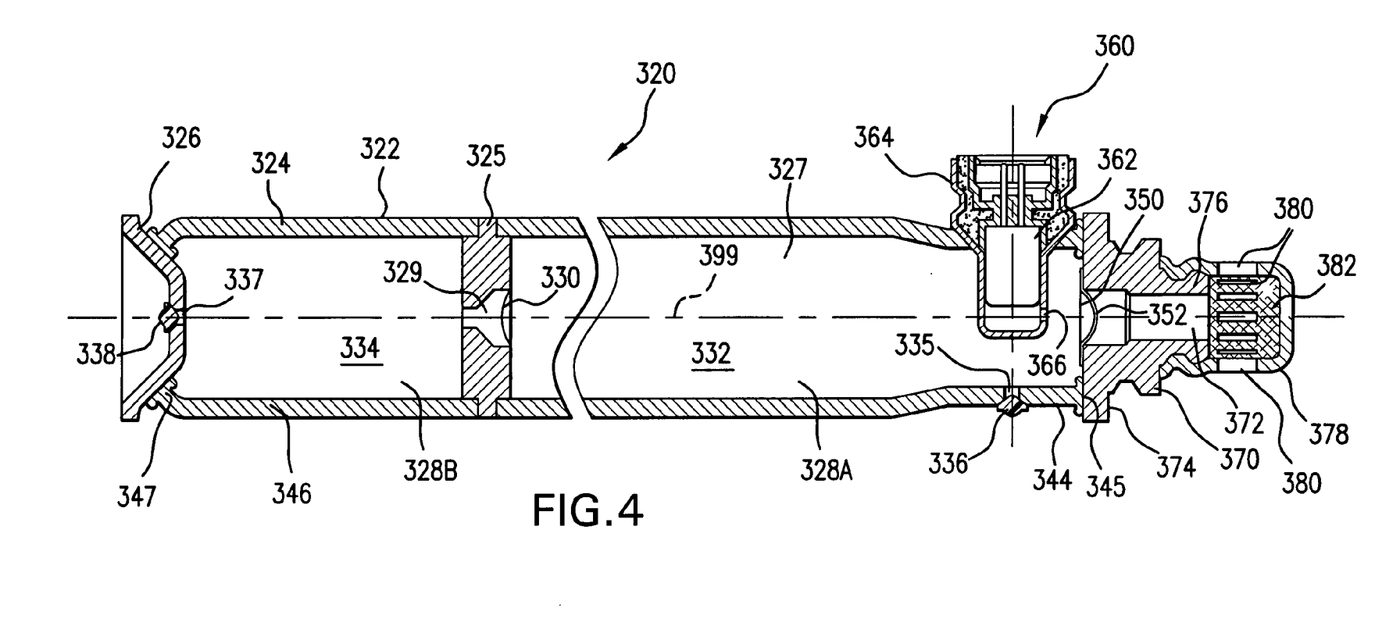
FIG. 4 is a fragmentary side view, in section, of an inflation assembly in accordance with another preferred embodiment of the invention.

FIG. 4 shows an inflator device 320 in static state and in accordance with one preferred embodiment of this invention. The inflator device 320 includes a pressure vessel 322 having a sidewall 324 and an end wall 326 connected to the side wall 324. As shown in FIG. 4, a bulkhead 325 is positioned within the pressure vessel 322 to divide or separate a gas storage chamber 327 into a first gas storage subchamber 328A and a second gas storage subchamber 328B. It is apparent to those skilled in the art and guided by the teachings herein provided that by dividing or separating the gas storage chamber 327 into the first gas storage subchamber 328A and the second gas storage subchamber 328B, the subchambers 328A and 328B can have the same or similar subchamber volumes, or the subchambers 328A and 328B can have different subchamber volumes, depending upon desired or suitable contents, and performance conditions and requirements.

The bulkhead 325 forms or includes a flow control orifice 329. The flow control orifice 329 is normally covered or obstructed by a closure element, such as a burst or rupture disk 330 to initially prevent fluidic communication between the first gas storage subchamber 328A and the second gas storage subchamber 328B. Those skilled in the art and guided by the teachings herein provided will appreciate that closure elements of other suitable types or forms can desirably be used in the practice of the invention and the broader practice of the invention is not necessarily limited to particular or specific types or forms of closure elements. In the illustrated static or at rest condition for the inflator device 320, the first gas storage subchamber 328A and the second gas storage subchamber 328B each is closed and has contents, designated by the reference numeral 332 and 334, respectively, therein stored or contained. The gas storage subchamber contents 332 and 334 desirably include a quantity of pressurized stored gas such as may be used in the inflation of an associated inflatable device, such as an inflatable airbag cushion.

In accordance with one preferred embodiment of the invention, the first gas storage subchamber 328A contains a different gas or gas mixture than a gas or gas mixture contained within the second gas storage subchamber 328B, which can be tailored to produce a desired or suitable inflation effect. Suitable gases include those gases as described above in reference to one preferred embodiment of this invention shown in FIG. 2. Preferably, the first gas storage subchamber 328A contains a gas or gas mixture having a first molecular weight and the second gas storage subchamber 328B contains a gas or gas mixture having a second molecular weight different than the first molecular weight. In certain preferred embodiments of the invention, the associated inflatable device is desirably intended to remain inflated for a relatively longer period of time such as to provide protection during an initial impact, as well as during the accident event such as in the event of a vehicle rollover. Gasses having a higher molecular weight and, thus, a greater mole/mass ratio, such as argon (MW=40), are generally more desirable than gasses having a lower molecular weight and, thus, a lesser mass/mole ratio, such as helium (MW=4), under such conditions. However, low molecular weight gasses, such as helium, tend to cause less damage to the associated inflatable device material during initial deployment than high molecular weight gasses, such as argon. Thus, it may be desirable to store within the first gas storage subchamber 328A a first gas or gas mixture and store within the second gas storage subchamber 328B a second gas or gas mixture different than the first gas or gas mixture to optimize inflator performance. For example, the gas or gas mixture contained within the first gas storage subchamber 328A may serve to properly position and initially inflate the associated inflatable device. The gas or gas mixture contained within the second gas storage subchamber 328B may then serve to maintain the associated inflatable device fully inflated for an extended time period. Therefore, the second gas storage subchamber 328B may contain a supply of pressurized gas having a molecular weight greater than a molecular weight of a supply of pressurized gas stored within the first gas storage subchamber 328A. It is apparent to those skilled in the art and guided by the teachings herein provided that, if desired or suitable, the second gas storage subchamber 328B may contain a supply of pressurized gas having a molecular weight less than a molecular weight of a supply of pressurized gas stored within the first gas storage subchamber 328A. The impact of gas molecular weight on inflator performance is, at least in part, the subject of Dinsdale et al., U.S. Pat. No. 6,726,243, issued 27 Apr. 2004, the disclosure of which is incorporated herein by reference.

As shown in FIG. 4, the sidewall 324 forms or includes a fill port 335, as is known in the art, wherethrough materials can be passed into the first gas storage subchamber 328A. After the first gas storage subchamber 328A has been appropriately filled, the fill port 335 can be appropriately blocked or plugged, as is known, such as by a pin or ball 336. Similarly, the end wall 326 forms or includes a fill port 337, as is known in the art, wherethrough materials can be passed into the second gas storage subchamber 328B. After the second gas storage subchamber 328B has been appropriately filled, the fill port 337 can be appropriately blocked or plugged, as is known, such as by a pin or ball 338. In the illustrated embodiment, the fill port 335 is shown in flow communication with the first gas storage subchamber 328A and the fill port 337 is shown in flow communication with the second gas storage subchamber 328B. As will be appreciated, such fill ports, if included in the inflator device 320, can alternatively be placed or positioned, as may be desired and understood by those skilled in the art. Thus, the broader practice of the invention is not necessarily limited to the inclusion of a fill port or the position or placement thereof.

Referring to FIG. 4, the pressure vessel 322 has a first end portion 344 defining a first end 345 and an opposing second end portion 346 defining a second end 347. A gas exit opening 350 is preferably formed at the first end 345 of the pressure vessel 322. The first gas storage subchamber 328A and the second gas storage subchamber 328B have a combined length along the longitudinal axis defined as the measurement between the first end 345 and the opposing second end 347 of the pressure vessel 322. The first gas storage subchamber 328A is normally closed or obstructed to prevent fluidic communication between the first gas storage subchamber 328A, containing the gas storage subchamber contents 332, and the gas exit opening 350 by means of a closure element, such as a burst or rupture disk 352. Those skilled in the art and guided by the teachings herein provided will appreciate that closure elements of other suitable types or forms can desirably be used in the practice of the invention and the broader practice of the invention is not necessarily limited to particular or specific types or forms of closure elements.

The inflator device 320 further includes an initiator assembly 360. The initiator assembly 360 includes an initiator 362 which is housed or contained at least partially within an initiator cover 364. Such initiator 362 is known in the art and actuatable to produce a discharge effective to rupture the burst disk 352 to allow flow of at least a portion of the gas storage subchamber contents 332 through the gas exit opening 350. In one preferred embodiment of the invention, the initiator cover 364 is mounted to the pressure vessel sidewall 324 at the first end portion 344 of the pressure vessel 322. At least a portion of the initiator cover 364 extends through the sidewall 324 at the first end portion 344 of the pressure vessel 322. Preferably, the initiator cover 364 extends radially inwardly into the first gas storage subchamber 328A toward the longitudinal axis 399.

Referring to FIG. 4, the initiator cover 364 forms at least one first radial aperture 366. Preferably but not necessarily, the first radial aperture 366 is axially aligned or positioned with the gas exit opening 350 and the burst disk 352. In one preferred embodiment of the invention, the first radial aperture 366 and the gas exit opening 350 each is positioned about the pressure vessel longitudinal axis 399 to allow the initiator discharge to directly communicate with the burst disk 352. The first radial aperture 366 is positioned at a direct discharge distance with respect to the burst disk 352 to focus the initiator discharge at or towards the burst disk 352 to rupture the burst disk 352 and allow fluidic communication between the first gas storage subchamber 328A and the gas exit opening 350, wherein at least a portion of the gas storage subchamber contents 332 can flow through the gas exit opening 350. Preferably, the direct discharge distance is less than about 50% of a length of the first gas storage subchamber 328A along the longitudinal axis 399, more preferably less than about 33% of the first gas storage subchamber length along the longitudinal axis 399, and in many cases less than about 25% of the first gas storage subchamber length along the longitudinal axis 399. In accordance with one preferred embodiment of the invention, the direct discharge distance is less than about 15% of the first gas storage subchamber length along the longitudinal axis 399, and more preferably less than about 10% of the first gas storage subchamber length along the longitudinal axis 399. Because the first radial aperture 366 is positioned within the direct discharge distance with respect to the burst disk 352, the first radial aperture 366 focuses or directs the initiator discharge at or towards the burst disk 352 to more reliably rupture the burst disk 352, when compared to conventional inflator devices wherein the initiator is positioned at an opposite end of the device with respect to the burst disk. Such placement allows for reliable rupturing or opening of a burst disk of suitable thickness and covering a suitably sized gas exit opening.

With the initiator 362 positioned at the first end portion 344 in close relation with gas exit opening 350 and in direct communication with the burst disk 352, i.e., the first radial aperture 366 positioned within the direct discharge distance with respect to the burst disk 352, the maximum internal pressure in the first gas storage subchamber 328A will remain much closer to the static state or storage pressure within the first gas storage subchamber 328A, as compared to conventional inflator devices such as described above. Thus, the sidewall 324 of the pressure vessel 322 according to the present invention can have a thickness significantly thinner than a thickness of conventional vessel walls required to accommodate or withstand large increases in internal pressure required to rupture the burst disk. The relatively thinner sidewall 324 provide a saving on manufacturing costs, envelope, and inflator weight. Further, cold gas can be released into the associated inflation device, such as an inflatable restraint cushion, at the beginning of the deployment, which will enable faster in-position times without overstressing the associated inflatable restraint cushion.

As shown in FIG. 4, the inflator device 320 also includes a diffuser body 370 forming a diffuser channel or passage 372 generally positioned coaxially with the pressure vessel longitudinal axis 399. The diffuser body 370 has a first end 374 connected or mounted with respect to the first end portion 344 of the pressure vessel 322 and a second end portion 376. The diffuser body 370 can be connected or mounted to the pressure vessel 322 using any suitable connecting or mounting means known to those having ordinary skill in the art and guided by the teachings herein provided. A diffuser cap 378 is connected or mounted to the second end portion 376 and preferably forms a plurality of diffuser orifices 380 generally positioned radially about a periphery of the diffuser cap 378. In the illustrated embodiments, the diffuser cap 378 is shown as being formed as a separate component such as joined or connected to the diffuser body 370. It is to be appreciated, however, that the broader practice of the invention is not necessarily so limited. For example, if desired, the invention can be practice using the diffuser cap 378 formed in or as a part of the diffuser body 370 and forming a plurality of diffuser orifices 380. The diffuser channel 372 provides for fluidic or gas flow communication between the first gas storage subchamber 328A and each diffuser orifice 380. Each diffuser orifice 380 dispenses inflation product gas from the inflator device 320 into an associated inflatable restraint device or airbag cushion (not shown in FIG. 4) in communication with the inflator device 320. Unlike many prior art diffuser assemblies which require complicated componentry for positioning the initiator within the inflator assembly, the present invention uses simplified components. For example, because the initiator assembly 360 is at least partially positioned or mounted within the pressure vessel 322, the diffuser design and configuration can be simplified to provide axial flow and/or radial flow, as desired for a particular inflator assembly application.

The diffuser cap 378 generally contains or houses a gas treatment element 382. In general accordance with the invention, desirable gas treatment of a contacting stream typically involves one or more of: cooling, redirection of flow, and removal or filtering of particulate from such contacting stream. In one preferred embodiment of the invention, the gas treatment element 382 is generally composed of a pack of woven and/or consolidated metal. Those skilled in the art and guided by the teachings herein provided will, however, appreciate that other forms of gas treatment elements can, if desired, be used and that the broader practice of the invention is not necessarily limited to specific or particular forms or types of gas treatment elements.

The initiator 362 is activated by a control assembly (not shown in FIG. 4) in operational control communication with the inflator device 320. The control assembly provides an initiating signal to the initiator 362 to produce a discharge effective to rupture the burst disk 352, whereby the gas storage subchamber contents 332 can flow through the gas exit opening 350 and into the diffuser body 370. For example, one or more crash sensors, such as known in the art, capable of sensing or detecting one or more selected parameters relating to the occurrence of a crash, is in signal communication with an electronic control unit ("ECU"), which can serve to signal and control if and when the initiator 362 is actuated and consequently if and when the inflator device 320 is actuated to discharge a desired inflation fluid. For example, upon receipt of a proper or appropriate signal from the crash sensors, the ECU will signal or otherwise actuate the initiator 362 such as to produce a discharge effective to rupture the burst disk 352, whereby the gas storage subchamber contents 332 can flow through the gas exit opening 350 and into the diffuser body 370.

As the gas storage subchamber contents 332 exits through the gas exit opening 350 into the diffuser body 370, a pressure within the first gas storage subchamber 328A decreases causing the burst disk 330 to rupture, whereby providing fluidic communication between the first gas storage subchamber 328A and the second gas storage subchamber 328B through flow control orifice 329. The gas storage subchamber contents 334 initially contained within the second gas storage subchamber 328B flows through flow control orifice 329 and into the first gas storage subchamber 328A. The flow control orifice 329 preferably meters the flow of the gas storage subchamber contents 334 into the first gas storage subchamber 328A. The gas storage subchamber contents 334 then flows through the gas exit opening 350 and into the diffuser body 370.

In view of the above, in one preferred embodiment of the invention, the initiator cover may form only a discharge aperture, such as a first radial aperture, which directs or focuses an initiator discharge at or towards a burst disk to rupture the burst disk and allow at least a portion of the gas storage chamber contents, including pressurized stored gas, to flow through the gas exit opening. For example, referring to FIGS. 5 and 6, if a cold gas inflation process is desirable such as to inflate an associated restraint curtain for rollover protection, a gas storage chamber may not necessarily contain or store a supply of gas-generating pyrotechnic material. If, however, envelope and weight is more important, in one preferred embodiment of the invention, the pressure vessel may include or contain a supply of gas-generating pyrotechnic material as well as the pressurized stored gas. The initiator cover may, in addition to the first radial aperture, include a second aperture in reaction initiation communication with the supply of gas-generating pyrotechnic material, to ignite the supply of gas-generating pyrotechnic material and initiate production of a product gas, which is releasable from within the gas storage chamber through the gas exit opening upon rupturing of the burst disk. Placing the gas-generating pyrotechnic material within the gas chamber allows an initial release of cold gas into the associated inflatable restraint device or airbag cushion, which is less aggressive and less apt to damage the associated inflatable restraint device or airbag cushion upon deployment.

Figure 5:
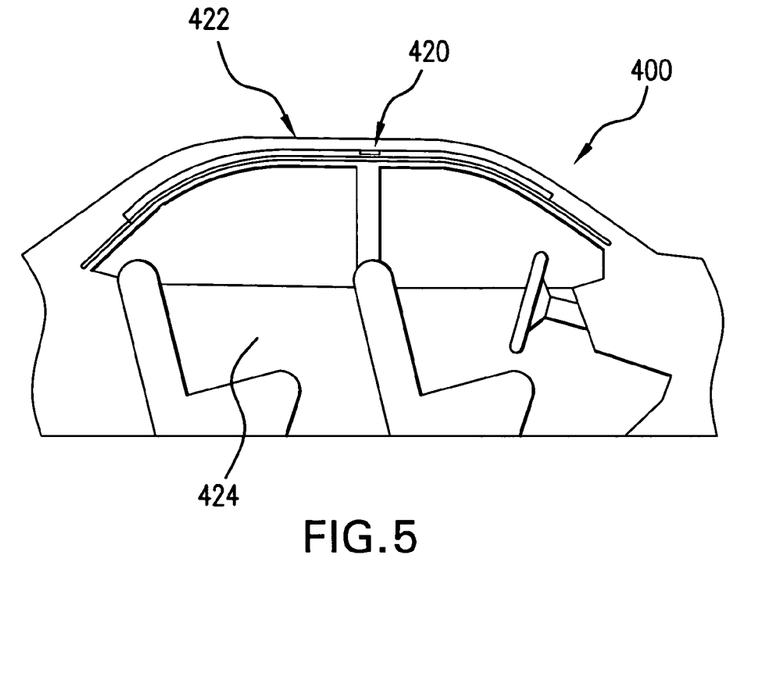
FIG. 5 is a simplified fragmentary schematic of an interior portion of a motor vehicle containing an inflation assembly, in accordance with one embodiment of the invention, in a static state.
Figure 6:
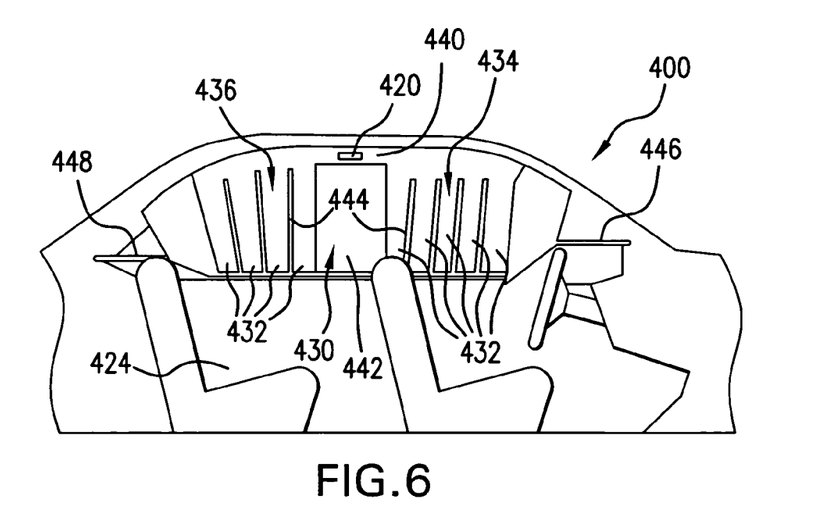
FIG. 6 is a simplified fragmentary schematic of an interior portion of a motor vehicle generally corresponding to FIG. 5 and containing an inflation assembly, in accordance with one embodiment of the invention, but now shown in an activated state.

Turning now to FIGS. 5 and 6, there is illustrated a simplified fragmentary schematic of an interior portion of a motor vehicle 400 which contains an inflator device 420 in accordance with the invention and alternatively similar to the inflator devices 120 and 220 described above. In the static state shown in FIG. 5, the inflator device 420 is generally disposed along the roof line 422 at or adjacent the vehicle door side 424. In FIG. 6, the inflator device 420 is shown in an activated state.

The inflator device 420 has associated therewith an inflatable restraint device 430 in the general form or configuration of an inflatable curtain airbag cushion. In one preferred embodiment of this invention, the inflator device 420 in accordance with the invention can be used in conjunction with an inflatable curtain airbag cushion, such as the type described in HÅland et al., U.S. Pat. No. 5,788,270, issued 4 Aug. 1998, the disclosure of which patent is hereby incorporated by reference herein in its entirety and made a part hereof. The inflatable restraint device 430 incorporates a plurality of parallel substantially vertical, substantially cylindrical cells 432 forming a front seat-adjacent inflatable section 434 and a rear seat-adjacent inflatable section 436 joined together by a connecting inflatable section 440, such as to better equalize the inflation forces in the front and rear section 434 and 436, and a connecting uninflatable section 442. The inflatable restraint device 430 may be made of interwoven fabric. Such a fabric comprises a first layer that defines the front part or region of the inflatable restraint device 430 (e.g., the part of the inflatable restraint device 430 that is visible in FIG. 6) and a second layer that defines the back part or region of the inflatable restraint device 430 (e.g., the part of the inflatable restraint device 430 that is adjacent the vehicle door side 424 in FIG. 6). Selected areas of the first and second regions in turn are interwoven to define links in the form of points or lines 444 where the front part and the back part of the inflatable element are secured together. A technique for making an inflatable element of interwoven fabric is described in more detail in PCT International Application Publication WO 90/09295.

The inflatable restraint device 430 also includes a first or forward webbing strap 446 and a second or rearward webbing strap 448 such as permits the inflatable restraint device 430 to desirably extend across the vehicle side 424 when in an activated inflated state, as shown in FIG. 6 and such as may desired to provide desired occupant protection.

The inflator device of th present invention supplies gas such as may be used in the inflation of an inflatable vehicle occupant restraint device, e.g., an inflatable airbag cushion. The inflator device utilizes stored pressurized gas with or without a gas-generating pyrotechnic material to inflate the associated inflatable vehicle occupant restraint device, depending upon the performance requirements.

Thus, the invention provides an inflator device having an initiator cover mounted to the sidewall of the pressure vessel, at least a portion of which extends radially inwardly into a gas storage chamber at a first end portion thereof. The initiator cover forms a first radial aperture that is positioned at a direct discharge distance with respect to a burst disk normally covering a gas exit opening formed at a first end of the gas storage chamber. The first radial aperture focuses the initiator discharge at the burst disk to rupture the burst disk to allow or provide fluidic communication between the gas storage chamber and the gas exit opening. Preferably, the direct discharge distance is less than about 50% of a length of the gas storage chamber along a longitudinal axis of the pressure vessel, more preferably less than about 33% of the gas storage chamber length along the longitudinal axis, and in many cases less than about 25% of the gas storage chamber length along the longitudinal axis. In accordance with one preferred embodiment of the invention, the direct discharge distance is less than about 15% of the gas storage chamber length along the longitudinal axis of the pressure vessel, and more preferably less than about 10% of the gas storage chamber length along the longitudinal axis. It may be desirable to position the initiator as close as possible to the burst disk to allow the pressure vessel to be as long as necessary without affecting the burst disk opening.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator device comprising:
a pressure vessel extending along a longitudinal axis, the pressure vessel forming an elongated gas storage chamber having contents including a supply of stored pressurized gas;
a gas exit opening formed at a first end of the elongated gas storage chamber;
a rupturable closure element normally covering the gas exit opening; and
an initiator assembly including an initiator cover mounted to a sidewall of the pressure vessel at a first end portion of the pressure vessel, at least a portion of the initiator cover extending radially inwardly into the elongated gas storage chamber toward the longitudinal axis, the initiator assembly also including an initiator positioned within the initiator cover, the initiator producing a discharge effective to rupture the closure element to allow flow of at least a portion of the gas storage chamber contents through the gas exit opening;
a first radial aperture formed in the initiator cover, the first radial aperture positioned at a direct discharge distance with respect to the closure element to focus the initiator discharge at the closure element to rupture the closure element.

2. The inflator device of claim 1 wherein the supply of pressurized gas comprises at least one of oxygen, nitrous oxide, argon and helium.

3. The inflator device of claim 1 further comprising a supply of gas-generating pyrotechnic material contained within the elongated gas storage chamber wherein at least a portion of the supply of gas-generating pyrotechnic material is reactable to produce a product gas.

4. The inflator device of claim 3 further comprising at least one second aperture formed in the initiator cover, the at least one second aperture m reaction initiation communication with the supply of gas-generating pyrotechnic material.

5. The inflator device of claim 3 wherein the initiator cover is positioned between the gas exit opening and the supply of gas-generating pyrotechnic material.

6. The inflator device of claim 1 further comprising a diffuser mounted on the pressure vessel first end portion.

7. The inflator device of claim 1 wherein the direct discharge distance is less than about 50% of a length of the elongated gas storage chamber along the longitudinal axis.

8. The inflator device of claim 1 wherein the direct discharge distance is less than about 25% of a length of the elongated gas storage chamber along the longitudinal axis.

9. The inflator device of claim 1 wherein the direct discharge distance is less than about 10% of a length of the elongated gas storage chamber along the longitudinal axis.

10. The inflator device of claim 1 wherein each of the gas exit opening and the first radial aperture is axially positioned about the longitudinal axis.

11. The inflator device of claim 1 further comprising:
a bulkhead positioned within the pressure vessel and dividing the elongated gas storage chamber into a first gas storage subchamber having a contents including a first supply of stored pressurized gas and a second gas storage subchamber having a contents including a second supply of stored pressurized gas;
a flow control orifice formed through the bulkhead; and
a second rupturable closure element normally covering the flow control orifice, the second closure element rupturable upon flow of at least a portion of the first gas storage subchamber contents through the gas exit opening.

12. The inflator device of claim 11 wherein the first supply of stored pressurized gas is different than the second supply of stored pressurized gas.

13. The inflator device of claim 11 wherein a molecular weight of the first supply of stored pressurized gas is different than a molecular weight of the second supply of stored pressurized gas.

14. The inflator device of claim 11 wherein a molecular weight of the first supply of stored pressurized gas is less than a molecular weight of the second supply of stored pressurized gas.

15. An inflator device comprising:
a pressure vessel forming an elongated gas storage chamber having contents including a supply of stored pressurized gas;
a gas exit opening fonned at a first end of the elongated gas storage chamber;
a rupturable burst disk normally obstructing the gas exit opening, the burst disk rupturable to allow flow of at least a portion of the gas storage chamber contents through the gas exit opening; and
an initiator assembly including an initiator cover extending through a sidewall of the pressure vessel, at least a portion of the initiator cover extending radially inwardly into the elongated gas storage chamber, the initiator assembly also including an initiator positioned within the initiator cover, the initiator producing a discharge effective to rupture the burst disk;
a first radial aperture formed in the initiator cover, the first radial aperture aligned with the gas exit opening and positioned at a direct discharge distance from the burst disk to focus the initiator discharge at the burst disk to rupture the burst disk, wherein the direct discharge distance is less than about 50% of a length of the elongated gas storage chamber.

16. The inflator device of claim 15 further comprising:
a supply of gas-generating pyrotechnic material contained within the elongated gas storage chamber wherein at least a portion of the supply of gas-generating pyrotechnic material is reactable to produce a product gas and heat; and
a second aperture formed in the initiator cover, the second aperture in reaction initiation communication with the supply of gas-generating pyrotechnic material.

17. The inflator device of claim 16 wherein at least a portion of the product gas is releasable from within the elongated gas storage chamber through the gas exit opening upon rupturing of the burst disk.

18. The inflator device of claim 16 wherein the first radial aperture and the gas exit opening each is positioned about the pressure vessel longitudinal axis.

19. A combination comprising:
the inflator device of claim 16; and
an inflatable restraint airbag cushion in communication with the inflator device.

20. The inflator device of claim 15 wherein the elongated gas storage chamber extends along a longitudinal axis of the pressure vessel.

21. A combination comprising:
the inflator device of claim 15; and
an inflatable restraint airbag cushion in communication with the inflator device.

22. The inflator device of claim 15 further comprising:
a bulkhead positioned within the pressure vessel and dividing the elongated gas storage chamber into a first gas storage subchamber having a contents including a first supply of stored pressurized gas and a second gas storage subchamber having a contents including a second supply of stored pressurized gas;
a flow control orifice formed through the bulkhead; and
a rupturable closure element normally covering the flow control orifice, the closure element rupturable upon flow of at least a portion of the first gas storage subchamber contents through the gas exit opening.

23. The inflator device of claim 22 wherein the first supply of stored pressurized gas is different than the second supply of stored pressurized gas.

24. The inflator device of claim 22 wherein a molecular weight of the first supply of stored pressurized gas is different than a molecular weight of the second supply of stored pressurized gas.

25. The inflator device of claim 22 wherein a molecular weight of the first supply of stored pressurized gas is less than a molecular weight of the second supply of stored pressurized gas.

26. An inflator device comprising:
a pressure vessel forming an elongated gas storage chamber;
a gas exit opening formed at a first end of the elongated gas storage chamber;
a supply of gas-generating pyrotechnic material contained within the elongated gas storage chamber wherein at least a portion of the supply of gas-generating pyrotechnic material is reactable to produce a product gas;
a burst disk normally obstructing the gas exit opening, the burst disk rupturable to allow fluidic communication between the elongated gas storage chamber and the gas exit opening; and
an initiator assembly including an initiator cover extending through a sidewall of the pressure vessel at a first end portion of the elongated gas storage chamber, at least a portion of the initiator cover extending radially inwardly into the elongated gas storage chamber, the initiator assembly also including an initiator positioned within the initiator cover, the initiator producing a discharge effective to rupture the burst disk and initiate a reaction of at least a portion of the supply of gas-generating pyrotechnic material to produce a product gas;
a first radial aperture formed in the initiator cover, the first radial aperture positioned at a direct discharge distance from the burst disk to focus the initiator discharge at the burst disk to rupture the burst disk;
a second aperture formed in the initiator cover, the second aperture in reaction initiation communication with the supply of gas-generating pyrotechnic nuterial.

27. The inflator device of claim 26 wherein the elongated gas storage chamber extends along a longitudinal axis of the pressure vessel.

28. The inflator device of claim 27 wherein the first radial aperture and the gas exit opening are coaxially positioned about the pressure vessel longitudinal axis.

* * * * *